United States Patent [19]

Höhlein et al.

[11] Patent Number: 4,798,859

[45] Date of Patent: Jan. 17, 1989

[54] POLYHYDROXYL COMPOUNDS CONTAINING ESTER AND ETHER GROUPS AS REACTIVE DILUENTS

[75] Inventors: Peter Höhlein, Kempen; Eberhard Kreiss; Franz Mory, both of Krefeld, all of Fed. Rep. of Germany; Bernd Riberi, Pittsburgh, Pa.

[73] Assignee: Bayer Aktiengesellschaft, Leverkusen, Fed. Rep. of Germany

[21] Appl. No.: 95,928

[22] Filed: Sep. 14, 1987

[30] Foreign Application Priority Data

Sep. 24, 1986 [DE] Fed. Rep. of Germany ....... 3632358

[51] Int. Cl.$^4$ ...................... C08L 67/06; C08L 67/02; C08L 67/08
[52] U.S. Cl. ......................................... 525/7; 525/48; 525/437; 525/447
[58] Field of Search ..................... 525/437, 447, 7, 48; 524/310

[56] References Cited

U.S. PATENT DOCUMENTS 4,218,355 8/1980 Chang .................................. 524/310

Primary Examiner—Patricia Short
Attorney, Agent, or Firm—Connolly and Hutz

[57] ABSTRACT

An improved lacquer system composition based on alkyl resins and/or oil-free polyesters contains as a reactive diluent the esterification product of (A) polyols containing an average on average at least 3 hydroxyl groups per molecule and, per hydroxyl group, an average of 0.5 to 15, but in total no more than an average of 20 ether groups per molecule and (B) 0.05 to 1.0 equivalent, based on hydroxyl groups of A, of $C_2$-$C_{30}$ monocarboxylic acids, with the proviso that the esterification products of A and B have an acid number of at most 5, a hydroxyl number of from 5 to 800 and, on average, from 0.1 to 5 hydroxyl groups per molecule.

6 Claims, No Drawings

POLYHYDROXYL COMPOUNDS CONTAINING ESTER AND ETHER GROUPS AS REACTIVE DILUENTS

This invention relates to the use of polyhydroxyl compounds containing ester and ether groups as reactive diluents for crosslinker-containing or air-drying coating compositions which contain oil-free polyesters or alkyd resins, optionally in combination with one or more crosslinking agents, as binder.

BACKGROUND OF THE INVENTION

"Reactive diluents" are understood to be low-viscosity liquids which dilute resin-like binders and thus provide the coating composition with the viscosity required for its application, contain functional groups capable of reaction with the binder and, during the hardening process, become part of the hardened coating to a predominant extent, depending on their volatility.

Numerous compounds have been proposed as reactive diluents both for crosslinker-containing and for air-drying coating compositions based on polyesters or alkyd resins; see for example, S. Enomoto et al., J. Appl. Polym. Sci. 22, 253-265 (1978); S. Hochberg, J. Oil Colour Chemists' Assoc. 48, 1043-1068 (1965); D. B. Larson/W. D. Emmons, "The Chemistry of High Solids Alkyd/Reactive Diluent Coatings", Coatings Conference, Athens 1982; DE-OS Nos. 24 46 760, 31 15 071 and 31 51 366. However, most of the proposed compounds have been unable to live up to expectations because they lead either to reduced gloss in the case of pigmenting and to a marked reduction in gloss on weathering or to extended drying times and, in some cases, even to tacky surfaces.

In addition, the compounds hitherto recommended as reactive diluents, due to their structure, are suitable in principle only for air-drying coating compositions or only for crosslinker-containing coating compositions. By contrast, there is no known class of reactive diluents for both binder systems.

The object of the present invention is to provide reactive diluents which overcome the disadvantages of the prior art so that it is possible to obtain lacquer systems based on alkyd resins and/or oil-free polyesters containing reactive diluents which harden in the requisite times to form satisfactory coatings and which contain no organic solvents or only small quantities of organic solvents which do not act as reactive diluents.

BRIEF DESCRIPTION OF THE INVENTION

Thus the present invention relates to lacquer systems based on alkyd resins and/or oil-free polyesters which contain as a reactive diluent a particular esterified reaction product. It has surprisingly been found that reaction products of polyhydroxyl compounds containing ether groups and (saturated and/or unsaturated) monocarboxylic acids satisfy the requirements of a superior reactive diluent in the lacquer systems of the invention. Through suitable choice of the monocarboxylic acid, the reaction product may be tailored to the desired application (reactive diluent for air-drying or crosslinker-containing lacquer systems, compatability with other additives, etc.). Where the reaction product is to be used as a reactive diluent for crosslinker-containing lacquers, the monocarboxylic acids could not be unsaturated because the crosslinking reaction takes place via free hydroxyl groups. Where a reactive diluent for air-drying lacquers is required, no importance is attached to free hydroxyl groups, although reactivity may be controlled through the type and quantity of unsaturated monocarboxylic acids.

The present invention relates to the use of esterification products of

A. polyols which contain on average at least 3 and preferably 4 to 8 hydroxyl groups per molecule and, per hydroxyl group, an average of 0.5 to 15 and preferably 1 to 5, but in all no more on average than 20 ether groups per molecule and B. from 0.05 to 1.0, preferably from 0.10 to 0.95 and more preferably from 0.30 to 0.90 equivalent (based on hydroxyl groups of A) of $C_2$–$C_{30}$, preferably $C_6$–$C_{30}$ and more preferably $C_8$–$C_{24}$ monocarboxylic acids, with the proviso that the esterification products of A and B have an acid number of at most 5 and a hydroxyl number of from 5 to 800 and preferably from 10 to 500 and contain on average from 0.1 to 6 hydroxyl groups per molecule, as reactive diluents for lacquer systems based on alkyd resins and/or oil-free polyesters.

Preferred polyols A are reaction products of I. polyhydroxyl compounds containing on average at least 3 and preferably 4 to 8 hydroxyl groups and 3 to 12 carbon atoms per molecule, which are used as "starters", and II. alkoxylating agents containing from 2 to 8 and preferably 2 or 3 carbon atoms per molecule.

Preferred starters A.I include, for example, glycerol, trimethylolethane and trimethylolpropane, pentaerythritol, sorbitol, mannitol, sucrose, lactose, sorbitan, α-methyl glycoside, α-hydroxy-$C_1$–$C_4$-alkyl glycoside and mixtures of these compounds. In addition to at least trifunctional hydroxyl compounds A.I, it is also possible, within the limits of the average hydroxyl functionality, to use diols containing up to 8 carbon atoms such as, for example, water, ethylene glycol, propylene glycol, 1,4-butanediol, diethylene glycol, dipropylene glycol and mixtures thereof. For example, a starter mixture of which the average hydroxyl functionality is below that of the higher polyols used, but is still at least 3, may be prepared from sorbitol (functionality of 6) or sorbitan (functionality of 4) with ethylene or propylene glycol or water (functionality of 2).

Instead of adjusting the functionality of the polyols A through the choice of the starter A.I used for the alkoxylation, it is also possible to mix separately prepared ether-group-containing polyols A of different functionality and/or hydroxyl number with one another in such a way that the parameters required by the Claims are achieved.

Preferred alkoxylating agents A.II include, for example, $C_1$–$C_8$ alkylene oxides, such as ethylene oxide, propylene oxide, 1,2- and 2,3-butylene oxide, styrene oxide and mixtures of these compounds. Particularly preferred alkoxylating agents are ethylene oxide, propylene oxide and mixtures thereof.

The monocarboxylic acids B used are preferably aliphatic monocarboxylic acids and, more preferably, unsaturated fatty acids having an iodine number of from 10 to 300. Examples of preferred monocarboxylic acids are acetic acid, butyric acid, n-heptane carboxylic acid, 2-ethylhexane carboxylic acid, n-nonane carboxylic acid, synthetic fatty acid mixtures containing from 10 to 18 carbon atoms and, in particular, unsaturated fatty acids, such as soya oil fatty acid, castor oil fatty acid, linoleic acid, olive oil fatty acid, safflower oil fatty acid, conjuvandol fatty acid, oleic acid, tall oil fatty acid and mixtures thereof.

The esterification of reactants A and B may be carried out in known manner and is preferably continued until the acid number has fallen to 5 or below. The viscosity is then generally between 50 and 4000 mPa.s, as measured in a Hoeppler viscosimeter at 20° C.

The esterification products of A and B used in accordance with the invention are generally added to the lacquer binders in quantities of from 5 to 75% by weight and preferably in quantities of from 10 to 50% by weight, based on the sum of binder and reactive diluent. The content of organic solvents which do not act as reactive diluents (i.e. do not remain in the lacquer film during hardening) may be distinctly reduced or even completely avoided by the reactive diluents used in accordance with the invention.

Alkyd resins and oil-free polyesters are understood to be polycondensates prepared by known methods of polycondensation from alcohols and carboxylic acids, of the type defined for example in Rompp's Chemielexikon, Vol. 1, page 202, Frankh'sche Verlagsbuchhandlung, Stuttgart, 1966, or described in D. H. Solomon, The Chemistry of Organic Film Formers, pages 75–101, John Wiley and Sons Inc., New York, 1967.

In the context of the invention, "alkyd resins" are understood to be fatty-acid- or oil-modified polyesters.

Preferred acid components for the synthesis of the polyesters or alkyd resins are aliphatic, cycloaliphatic, saturated or unsaturated and/or aromatic polybasic carboxylic acids, preferably di-, tri- and tetracarboxylic acids, containing from 2 to 14 and preferably from 4 to 12 carbon atoms per molecule or esterifiable derivatives thereof (for example anhydrides or esters), for example phthalic acid anhydride, isophthalic acid, terephthalic acid, tetra- hydro- and hexahydrophthalic acid anhydride, endomethylene tetrahydrophthalic acid, succinic acid, glutaric acid, sebacic acid, azelaic acid, trimellitic acid and trimellitic acid anhydride and pyromellitic acid anhydride. Phthalic acid anhydride is the most common acid component.

Preferred alcohols for the synthesis of the polyesters or alkyd resins are aliphatic, cycloaliphatic and/or araliphatic alcohols containing from 1 to 15 and preferably from 2 to 6 carbon atoms and from 1 to 6 and preferably from 1 to 4 OH groups attached to non-aromatic carbon atoms per molecule, for example glycols, such as ethylene glycol, 1,2- and 1,3-propanediol, 1,2-, 1,3- and 1,4-butanediol, 2-ethyl-1,3-propanediol, 2-ethyl-1,3-hexanediol, neopentyl glycol, 2,2-trimethyl-1,3-pentanediol, 1,6-hexanediol, cyclo-1,2- and -1,4-hexanediol, 1,2- and 1,4-bis-(hydroxymethyl)-cyclohexane, adipic acid-bis-(ethylene glycol ester); ether alcohols, such as diethylene and triethylene glycol, dipropylene glycol; dimethylolpropionic acid, alkoxylated bisphenols containing 2 $C_2$–$C_3$ alkoxyl groups per molecule, perhydrogenated bisphenols; 1,2,4-butanetriol, 1,2,6-hexanetriol, trimethylolethane, trimethylolpropane, trimethylolhexane, glycerol, pentaerythritol, dipentaerythritol, mannitol and sorbitol. The most common alcohols are glycerol, trimethylolpropane, neopentyl glycol and pentaerythritol.

Preferred monocarboxylic acids for the production of the polyesters or alkyd resins are aliphatic, cycloaliphatic, saturated and unsaturated and/or aromatic monocarboxylic acids containing from 3 to 24 carbon atoms per molecule, such as benzoic acid, p-tert.-butyl benzoic acid, tolylic acid, hexahydrobenzoic acid, abietic acid and lactic acid.

Monohydric $C_1$–$C_8$ alcohols, such as methanol, propanol, cyclohexanol, 2-ethylhexanol, benzylalcohol, may also be incorporated in the alkyd resins or polyesters by condensation in quantities of up to 15% by weight, based on alkyd resin or polyester. It is also possible to replace up to 25% of the ester bonds by urethane bonds.

In the alkyd resins, the oil length, expressed as triglyceride and based on the alkyd resin, is generally from 5 to 75 and preferably from 20 to 70% by weight. The drying or non-drying fatty acids, which generally contain 6 to 24 carbon atoms, may be used either as such or in the form of their glycerol esters (triglycerides).

Preference is attributed to vegetable and animal oils, fats or fatty acids, such as for example coconut oil, peanut oil, castor oil, wood oil, olive oil, soya bean oil, linseed oil, cottonseed oil, safflower oil or the corresponding fatty acids, dehydrated castor oil or the corresponding fatty acid, monounsaturated fatty acids, lard, tallow and train oils, tall oil fatty acid and synthetic fatty acids of the type obtainable from natural unsaturated oils or fatty acids by conjugation or isomerization. Preferred saturated fatty acids are, for example coconut oil fatty acids, 2-ethyl hexanoic acid, isononanoic acid (3,4,4-trimethylhexanoic acid), palmitic and stearic acid and also synthetic saturated, branched fatty acids.

The molecular weight of the polyesters or alkyd resins, determined as the number average, is from 2000 to 10,000 (molecular weights up to 5000 determined by vapor pressure osmometry in dioxane and acetone; the lower value in the case of differing values being regarded as correct; molecular weights over 5000 determined by membrane osmometry in acetone).

According to the invention, the reactive diluents used for the production of air-drying lacquers are esterification products which contain residues of drying fatty acids (i.e. mono- or polyethylenically unsaturated fatty acids copolymerizable in air) so that their reactive C=C-double bonds can copolymerize with those of the alkyd resins used. In this case, the esterification products preferably have a free hydroxyl group content below 1% by weight, based on the esterification product. The air-drying lacquers may readily be produced by mixing alkyd resins, esterification product (reactive diluent) and, optionally, standard additives.

According to the invention, the reactive diluents used for crosslinker-containing lacquers are esterification products which contain on average at least 2 and preferably 2 to 3 hydroxyl groups reactive with the crosslinker per molecule of esterification product. The monocarboxylic acid residues of these esterification products may, but do not have to, emanate from drying fatty acids because chemical incorporation in the lacquer film does of course take place through reaction of the hydroxyl groups.

Suitable crosslinkers for crosslinker-containing lacquers include both components which can be stored with the polyesters and reactive diluents at room temperature ("one-pot systems", stoving lacquers) and also components which cannot be stored with the polyesters and reactive diluents at room temperature because of their reactivity ("two-pot systems").

Preferred crosslinkers include primarily the following types:
aminoplast resins capable of condensation reactions with hydroxyl groups, such as melamine-formaldehyde, ureaformaldehyde or guanidine-formaldehyde condensation products, of the type described for example in FR-PS No. 943 411 or by D. H. Solomon in "The Chemistry of Organic Filmformers", pages 235–240, John Wiley and Sons, Inc., New York, 1974;

phenoplast resins capable of condensation reactions with hydroxyl groups, such as resols or novolaks, of the type described for example in "Methoden der Organischen Chemie" (Houben-Weyl), Vol. 14/2, 4th Edition, Georg Thieme Verlag, Stuttgart 1963, pages 193–292;

polyepoxides capable of addition reactions with hydroxyl groups;

polyisocyanates in which the isocyanate groups are present. in free form ("two-pot systems") or in masked form ("one-pot systems").

Polyisocyanates preferred as crosslinkers are described, for example, in the following: U.S. Pat. Nos. 3,124,605, 3,358,010, 3,903,126, 3,903,127, 3,976,622, 3,183,122, 3,394,111, 3,645,979 and 3,919,218; and British Pat. Nos. 1 060 430, 1 234 972, 1 506 3703 and 1 458 564. The polyisocyanates preferably contain biuret groups, urethane groups, allophanate groups or isocyanurate groups.

Polyisocyanates containing biuret groups are preferably reaction products of alkylene diisocyanates containing from 4 to 6 carbon atoms in the alkylene group and water.

Polyisocyanates containing urethane groups are preferably synthesized from aliphatic triols and tetraols containing from 3 to 8 carbon atoms, such as for example trimethylolpropane, glycerol, pentaerythritol and aromatic or cyclo-aliphatic diisocyanates containing from 8 to 18 carbon atoms, such as 2,4- and/or 2,6-tolylene diisocyanate, 2,4'- and/or 4,4'-diisocyanatodicyclohexylmethane, isophorone diisocyanate, etc., approximately 0.5 mole of diisocyanate having reacted per hydroxyl group of the polyol.

Polyisocyanates containing isocyanurate groups are cyclotrimerization products of the above-mentioned aliphatic and aromatic diisocyanates, more especially of tolylene diisocyanate or hexamethylene diisocyanate.

Preferred isocyanate blocking agents are, for example, phenols, particularly phenol itself, oximes, such as cyclohexanone oxime, lactams, such as $\epsilon$-caprolactam, 1,3-diketo compounds, such as malonic acid diethyl ester or acetoacetic acid ethyl ester. The polyisocyanates thus blocked may be used with advantage as crosslinking agents for stoving lacquers.

The polyisocyanates are generally used in such quantities that, for every hydroxyl group of the combination (polyester+reactive diluent), there are from 0.5 to 2 and preferably from 0.7 to 1.3 free isocyanate groups or diisocyanate groups set free by deblocking.

Crosslinking agents which do not belong to the class of (optionally blocked) polyisocyanates are usually used in such quantities that, for every hydroxyl group of the combination (polyester+reactive diluent), there are from 0.8 to 2.5 and preferably from 0.9 to 1.5 reactive groups of the crosslinker.

Crosslinker-containing lacquers may be prepared by mixing polyester, esterification product (reactive diluent) and, optionally, standard additives, the crosslinker being added in the case of "one-pot systems" and being kept separate in the case of "two-pot systems".

Standard additives which may be used in the production of the lacquers include, for example, organic solvents which do not act as reactive diluents, siccatives, levelling agents, antiskinning agents, foam inhibitors, viscosity regulators, pigments, dyes, hardening catalysts, UV absorbers, stabilizers against thermal or oxidative degradation, etc.

Preferred organic solvents are, for example, monohydric alcohols, such as methanol, ethanol, isopropanol; carboxylic acid alkyl esters, such as acetic acid ethyl and butyl ester; ether alcohols, such as propylene glycol monoethyl ether; ether esters, such as propyl glycol acetate, ketones, such as methyl ethyl ketone, methyl isobutylketone, cyclohexanone; aromatic hydrocarbons, such as toluene and xylene; and aliphatic hydrocarbons, such as various petrol fractions. Where crosslinkers containing free isocyanate groups are used, there is of course no need to use organic solvents containing isocyanate-reactive groups.

The organic solvents are preferably used in quantities of less than 20% by weight and more preferably in quantities of less than 10% by weight, based on binder/reactive diluent and crosslinker. The use of organic solvents is preferably avoided altogether.

The lacquers may be used as coating compositions for substrates of all kinds, including wood, plastics, leather, fabrics, glass, ceramics, metals. They may be applied by standard methods, such as spray coating, spread coating, flood coating, casting, dip coating, roll coating. The quantities in which they are applied are generally selected to give dry film thicknesses (after hardening) of from 0.005 to 0.10 mm.

The coating compositions containing the reactive diluents used in accordance with the invention may be hardened at temperatures of from 0° to 250° C., depending on the nature of the hardening reaction. Air-drying lacquers and those which contain crosslinkers containing free isocyanate groups are generally hardened at temperatures of from 0° to 130° C. and preferably at room temperature. Stoving lacquers, which contain blocked polyisocyanates or aminoplasts for example as crosslinking agents, generally require hardening temperatures of from 60° to 250° C. In some cases, it is of advantage to begin the hardening reaction at temperatures below 120° C. and then to complete it at temperatures above 120° C.

The coating compositions may be used both as clear lacquers and also as pigmented lacquers. They give lacquer films characterized by high surface gloss, high covering power, a balanced hardness/elasticity level, good resistance to water and chemicals and favorable weathering behavior.

In the following Examples, percentages are percentages by weight while parts are parts by weight.

EXAMPLES

Production of the reactive diluents (Taking reactive diluent A as an Example)

2857 g of soya oil fatty acid and 1827 g of a propoxylated mixture of sorbitol and propylene glycol (molar ratio 2:1) having a hydroxyl number of 475 and an equivalent weight of 118 are weighed into a 5 liter vessel equipped with a stirrer, heating system, nitrogen inlet pipe, column and water outlet while nitrogen is passed through at a rate of 2 to 3 liters per hour. The contents of the vessel were then heated to 200° C. over a period of 3 hours, during which the temperature measured at the head of the column did not exceed 105° C. When a sump temperature of 200° C. had been reached and the temperature at the head of the column fell below 90° C., the column was first removed and then the stream of nitrogen increased to 10 to 12 liters per hour. When an acid number of 1.6 was reached, the contents of the vessel were cooled to 100° C. and the product filtered through a cloth filter: liquid having an OH number of 66, an iodine color number of 5 and a viscosity of 219 mPa.s at 20° C.

Reactive diluents B to L were similarly prepared (see Table).

number of 16.2 and a viscosity of 5060 mPa.s (20° C.) was obtained.

EXAMPLE 2

A binder mixture having the following characteristic data was prepared as in Example 1 from 1350 g of the resin described in Comparison Example 1 (solvent-free), 450 g of reactive diluent C and 300 g of petrol: solids content 84.8%; viscosity 5460 mPa.s (20° C.); acid num-

| Reactive diluent | Acid Quantity/type | Propoxylated polyol Quantity/type | OH number | $EW^{(3)}$ | Acid number | OH number | Esterification product $ICN^{(4)}$ | Viscosity [mPa.s] at 20° C. |
|---|---|---|---|---|---|---|---|---|
| A | 2857 soya oil | 1827 Sorbitol/PG$^{(1)}$ (2:1)$^{(2)}$ | 475 | 118 | 1.6 | 66 | 5 | 219 |
| B | 1147 tall oil | 524 sorbitol/PG$^{(1)}$ (2:1)$^{(2)}$ | 475 | 118 | 3.0 | 26 | 8 | 238 |
| C | 1102 soya oil | 569 sorbitol | 425 | 125 | 2.0 | 24 | 5 | 301 |
| D | 1112 tall oil | 557 sorbitol | 425 | 125 | 3.2 | 23 | 10 | 384 |
| E | 3200 soya oil | 927 sorbitol$^{(5)}$/ 579 PG$^{(1)}$ | 425 515 | 125 109 | 2.7 | 12.7 | 4 | 128 |
| F | 3226 tall oil | 908 sorbitol$^{(5)}$/ 567 PG$^{(1)}$ | 425 515 | 125 109 | 4.2 | 22.6 | 8 | 168 |
| G | 3201 soya oil | 1505 sorbitol/PG$^{(1)}$ (2:1)$^{(2)}$ | 475 | 118 | 1.7 | 25 | 6 | 167 |
| H | 2059 | 2573 sorbitol | 425 | 125 | 1.5 | 168 | 3 | 1063 |
| J | 2165 soya oil | 1391 sorbitol$^{(5)}$/ 1082 PG$^{(1)}$ | 425 515 | 125 109 | 1.5 | 163 | 4 | 188 |
| K | 1541 EH$^{(6)}$ | 1491 sorbitol$^{(5)}$/ 1160 PG$^{(1)}$ | 425 515 | 125 109 | 1.9 | 162 | 12 | 190 |
| L | 1869 EH$^{(6)}$ | 1330 sorbitol$^{(5)}$/ 1034 PG$^{(1)}$ | 425 515 | 125 109 | 2.5 | 98 | 7 | 201 |

$^{(1)}$Propylene glycol
$^{(2)}$Molar ratio
$^{(3)}$Equivalent weight
$^{(4)}$Iodine color number
$^{(5)}$90% aqueous solution
$^{(6)}$2-ethyl hexanoic acid Production of the high-solids binders

COMPARISON EXAMPLE 1

4515 g of soya oil fatty acid, 1392 g of pentaerythritol and 1780 g of phthalic acid anhydride were weighed into a 10 liter stirring vessel equipped with a nitrogen inlet pipe and water separator and, while nitrogen was passed through at a rate of 6 liters per hour, were condensed to a viscosity corresponding to a flow out time (here and in the following: measured in accordance with DIN 53 211 using a DIN 4 cup) of 63 seconds (60% in petrol, boiling range: 120°–180° C.), cooled to 180° C. and kept at that temperature until a viscosity corresponding to a flowout time of 73 seconds (60% in petrol) and an acid number of 17 had been reached. After cooling and preparation of a 75% solution in petrol, a supply-quality resin having a viscosity of 8395 mPa.s at 20° C. was obtained.

EXAMPLE 1

1350 g of the resin described in Comparison Example 1 (solvent-free) was melted by heating to 120° C. in a 3 liter three-necked flask while nitrogen was passed through at a rate of 0.5 liter per hour and mixed with 450 g of reactive diluent B. After a solids content of 85.5% had been adjusted by addition of 290 g of petrol, a binder mixture having an acid number of 13.2, an OH ber 12.9; OH number 16.2.

EXAMPLE 3

A binder mixture having the following characteristic data was prepared as in Example 1 from 1350 g of the resin described in Comparison Example 1 (solvent-free), 450 g of reactive diluent D and 290 g of petrol: solids content 84.8%; acid number 13.0; OH number 23; viscosity 5214 mPa.s (20° C.).

COMPARISON EXAMPLE 2

As in Comparison Example 1, 8487 g of soya oil, 1913 g of pentaerythritol and 0.49 g of dibutyltin dioxide were transesterified in a 15 liter stirring vessel at 250° C. while nitrogen was passed through at a rate of 30 liters per hour until 1 part of a sample dissolved in 15 parts of ethanol remained clear at 10° C. After cooling to 200° C. and the removal of 1000 g of resin, 3384 g of phthalic acid anhydride were added and heated to 260° C. The mixture was condensed to a viscosity corresponding to a flowout time of 77 seconds (50% in petrol), cooled to 200° C. and kept at that temperature until a viscosity corresponding to a flowout time of 136 seconds had been reached, cooled to 160° C. and then kept at that temperature until a viscosity corresponding to a flowout time of 174 seconds had been reached. After dissolution in petrol a resin having a solids content of 60.6, a viscosity of 7490 mPa.s at 20° C. and an acid number of 5.0 was obtained.

EXAMPLE 4

A binder mixture having the following characteristic data was obtained from 1125 g of the solvent-free resin described in Comparison Example 2, 375 g of reactive diluent A and 500 g of petrol: solids content 74.8%; acid number 4.4; OH number 31.6; viscosity 7557 mPa.s (20° C.).

EXAMPLE 5

A binder mixture having the following characteristic data was obtained from 1125 g of the solvent-free resin described in Comparison Example 2, 375 g of reactive diluent G and 500 g of petrol: solids content 74.9%; acid number 4.8; OH number 21.6; viscosity 8789 mPa.s (20° C.).

COMPARISON EXAMPLE 3

As in Comparison Example 1, 2145 g of peanut oil fatty acid, 2310 g of trimethylolpropane, 600 g of triethylene glycol, 52 g of maleic acid anhydride and 2514 g of phthalic acid anhydride were condensed in a 10 liter stirring vessel at 240° C. while nitrogen was passed through to a viscosity corresponding to a flowout time of 84 seconds (60% in xylene), an acid number of 10.8, an iodine color number of 2 and an OH number of 144.

A sample solution in butyl acetate had a viscosity of 1443 mPa.s (20° C.) for a solids content of 74.8%.

EXAMPLE 6

A binder mixture having the following characteristic data was obtained from 1552.5 g of the resin described in Comparison Example 3, 517.5 g of reactive diluent H and 230 g of butyl acetate: solids content 89.6%; acid number 8.9; iodine color number 2; viscosity 18323 mPa.s (20° C.); OH number 138.

EXAMPLE 7

A binder mixture having the following characteristic data was obtained from 1552.5 g of the resin described in Comparison Example 3, 517.5 g of reactive diluent I and 230 g of butyl acetate: solids content 87.9%; acid number 9.1; viscosity 10078 mPa.s (20° C.); iodine color number 2; OH number 151.

COMPARISON EXAMPLE 4

As in Comparison Example 1, 730 g of isononanoic acid, 1493 g of a mixture of 5% of lauric acid, 30% of myristic acid, 57% of palmitic acid and 8% of stearic acid, 2487 g of trimethylolpropane, 95 g of ethylene glycol and 3063 g of phthalic acid anhydride were heated to 200° C. in a 10 liter stirring vessel over a period of 12 hours, during which nitrogen was passed through at a rate of 20 liters per hour, and condensed to a viscosity corresponding to a flowout time of 73 seconds (50% in xylene) and an acid number of 19.

A sample solution in Solvesso 100 ® (a solvent containing aromatic fractions manufactured by Esso) had a viscosity of 6268 mPa.s (20° C.) for a solids content of 60.1%.

EXAMPLE 8

A binder mixture having the following characteristic data was obtained from 1293.7 g of the resin described in Comparison Example 4, 431.3 g of reactive thinner L and 575 g of Solvesso 100 ®: solids content 72.2%; acid number 9.3; iodine color number 2; OH number 64; viscosity 12957 mPa.s (20° C.).

EXAMPLE 9

A binder mixture having the following characteristic data was obtained from 1293.7 g of the resin described in Comparison Example 4, 431.3 g of reactive diluent K and 575 g of Solvesso 100 ®: solids content 71.2%; acid number 9.2; iodine color number 2; OH number 69; viscosity 10143 mPa.s (20° C.).

Clear lacquers and pigmented white lacquers were prepared in accordance with the above-mentioned formulations from the binders described in Comparison Examples 1 and 2 and Examples 1 to 5 and were comparatively tested as oxidatively drying paints. The test results are listed in the Tables.

Production of the clear lacquers

By addition of petrol and siccatives, the resins of the Examples and Comparison Examples were adjusted to a viscosity corresponding to a flowout time of 120 seconds and applied to glass plates in a wet film thickness of approximately 120 μm. Cobalt octoate, lead octoate and calcium octoate were used as the siccatives. The metal contents based on the solids content were 0.04% cobalt, 0.4% lead and 0.1% calcium.

| | Characteristic data of the clear lacquers | | | | |
|---|---|---|---|---|---|
| | Viscosity corresponding to a flowout time (s) (DIN 53211) | Solids content (%) | Percentage composition clear lacquer | | |
| | | | Binder | Solvent | Auxiliaries |
| Example 1 | 116 | 668.9 | 69.21 | 23.54 | 7.25 |
| Example 2 | 115 | 67.6 | 68.31 | 24.53 | 7.16 |
| Example 3 | 120 | 68.1 | 68.41 | 24.42 | 7.17 |
| Comparison 1 | 112 | 58.9 | 59.96 | 33.76 | 6.28 |
| Example 4 | 117 | 53.9 | 53.19 | 43.45 | 3.36 |
| Example 5 | 120 | 53.0 | 52.68 | 43.99 | 3.33 |
| Comparison 2 | 120 | 43.9 | 42.92 | 54.37 | 3.71 |

| | Properties | | | | | |
|---|---|---|---|---|---|---|
| | Initial drying (h) | | Thorough drying (h) | | | Dry film thickness [μm] |
| | dust-dry | tack-free | 24 | 48 | 72 | |
| Example 1 | 4.0 | 7.0 | 1 | 1+ | 0(−) | 45 |
| Example 2 | 4.0 | 7.0 | 1 | 0/1 | 0− | 40 |
| Example 3 | 4.0 | 6.0 | 1 | 1+ | 0(−) | 40 |
| Comparison 1 | 2.5 | 4.0 | 1/2 | 0/1 | 0− | 40 |
| Example 4 | 4.0 | 16.0 | 0− | 0(−) | 0(−) | 35 |
| Example 5 | 4.0 | 7.5 | 0− | 0 | | 40 |
| Comparison 2 | 2.0 | 4.5 | 0− | 0 | | 40 |

Production of a white lacquer

A white lacquer was prepared in such a way that a lacquer having a viscosity corresponding to a flowout time of 150 seconds was obtained by combining the constituents after grinding in a bead mill.

| Parts | |
|---|---|
| 111.73 | binder as, for example, in Example 1, 90% in petrol |
| 3.75 | calcium octoate containing 4% metal |
| 1.50 | montmorillonite as antisedimentation agent |
| 70.00 | titanium dioxide |
| 0.66 | cobalt octoate containing 6% metal |
| 2.50 | lead octoate containing 24% metal |
| 1.50 | methyl ethyl ketoxime, 55% |
| 19.00 | petrol |
| 210.64 | |

| | Characteristic data of the white lacquers | | | | | |
|---|---|---|---|---|---|---|
| | Viscosity corresponding to a flowout time (s) DIN 53211 | Solids content (%) | Percentage composition of the lacquer | | | |
| | | | Binder | Pigment | Solvent | Auxiliaries |
| Example 1 | 151 | 78.7 | 45.25 | 31.68 | 17.65 | 5.42 |
| Example 2 | 149 | 78.4 | 45.07 | 31.55 | 17.98 | 5.40 |
| Example 3 | 151 | 78.2 | 44.90 | 31.44 | 18.28 | 5.38 |
| Comparison 1 | 144 | 72.0 | 41.45 | 29.00 | 24.58 | 4.97 |
| Example 4 | 148 | 67.3 | 39.29 | 27.50 | 30.13 | 3.08 |
| Example 5 | 144 | 68.7 | 38.56 | 26.99 | 31.43 | 3.02 |
| Comparison 2 | 150 | 63.6 | 34.79 | 24.35 | 38.15 | 2.71 |

| | Properties of the white lacquers (wet film thickness 150 μm) | | | | | |
|---|---|---|---|---|---|---|
| | Initial drying (h) | | Thorough drying (h) | | | Dry film thickness [μm] |
| | Dust-dry | Tack-free | 24 | 48 | 72 | |
| Example 1 | 5.5 | 8 | 1/2 | 1+ | 0/1 | 60 |
| Example 2 | 5.5 | 8 | 1− | 0/1 | 0− | 60 |
| Example 3 | 5.5 | 8 | 1/2 | 1 | 0− | 60 |
| Comparison 1 | 2.5 | 5.5 | 1 | 1+ | 0− | 60 |
| Example 4 | 4.5 | 8.0 | 0/1 | 0(−) | 0 | 50 |
| Example 5 | 5.0 | 16.0 | 0/1 | 0(−) | 0 | 50 |
| Comparison 2 | 2.5 | 4.5 | 0/1 | 0− | 0(−) | 50 |

Clear lacquers were prepared from the binders of Comparison Example 3 and Examples 6 and 7 by addition of aromatic polyisocyanates (Desmodur L ®, Desmodur IL ®, products of Bayer AG) and, after adjustment to a spraying viscosity corresponding to a flowout time of 25 seconds with butyl acetate, were applied to glass plates in a layer thickness of approximately 150 μm (wet film).

The characteristic data of the binders and lacquers and also their properties are shown in the following Tables:

| Dilution behavior (viscosity corresponding to flowout time (s) DIN 53211) | | | | | | |
|---|---|---|---|---|---|---|
| Solids content (%) | 80 | 75 | 70 | 65 | 60 | 55 |
| Example 6 | 205 | 90 | 45 | 25 | 19 | — |
| Example 7 | 152 | 76 | 39 | 23 | — | — |
| Comparison 3 | n.m. | n.m. | 71 | 42 | 25 | 18 | n.m. = non-measurable

| Lacquer formulation (parts by weight) | | | |
|---|---|---|---|
| | I | II | III |
| Example 6 | 100 | — | — |
| Example 7 | — | 100 | — |
| Comparison 3 | — | — | 100 |
| Desmodur ® IL/L 6:4 | 88.9 | 88.9 | 74.1 |
| Butyl acetate | 71.6 | 65.6 | 50.0 |

A clear lacquer having a viscosity corresponding to a flowout time of 26 seconds was prepared by combining the components indicated in the lacquer formulation.
Desmodur®IL=50% solution of an aromatic polyisocyanate in n-butyl acetate
Desmodur®L=75% solution of an aromtic polyisocyanate in ethyl acetate

| Testing of the clear lacquers (180 μm) | | | |
|---|---|---|---|
| | I | II | III |
| Viscosity corresponding to a flowout time (s) (DIN 53211) | | | |
| 0 h | 26 | 26 | 26 |
| 2 h | 33 | 35 | 33 |
| 4 h | 49 | 56 | 44 |
| 6 h | 72 | 90 | 57 |
| 8 h | 110 | 140 | 80 |
| Standing time (h) | 8–24 | 8–24 | 8–24 |
| Hand drying (mins.) | 43 | 46 | 74 |
| Pendulum damping (Konig) (s) after | | | |
| 2 h | 27 | 24 | 21 |
| 3 h | 38 | 31 | 32 |
| 4 h | 48 | 39 | 45 |
| 6 h | 60 | 50 | 64 |
| 8 h | 71 | 64 | 84 |
| 24 h | 122 | 119 | 143 |

Pigmented which lacquers were prepared in accordance with the above formulation from the binders described in Comparison Example 4 and in Examples 8 and 9 and stoved with melamine resin crosslinkers. Hard and elastic films showing good optical properties were obtained. Stoving conditions: 130° C./30 mins.; layer thickness of the films applied: 120 μm

| | | | |
|---|---|---|---|
| Resin of Comparison Example 4 | 131.73 | | |
| Resin of Example 8 | | 109.6 | |
| Resin of Example 9 | | | 109.6 |
| Butanol-etherified melamine resin[1] | 4.73 | 4.73 | 4.73 |
| Maprenal MF paste 650[2] | 106.38 | 106.38 | 106.38 |
| Glycolic acid butyl ester | 3.96 | 3.96 | 3.96 |
| Butanol | 11.13 | 11.13 | 11.13 |
| Xylene | 7.0 | 12.0 | 13.0 |
| Methoxypropanol | 6.60 | 6.60 | 6.60 |
| Levelling agent[3] | 0.57 | 0.57 | 0.57 |

[1]Maprenal ® MF650, 55% = a product of Hoechst AG
[2]Pigment paste preparation in a ratio by weight of 100 parts Maprenal ® MF650, 55%, to 220 parts titanium dioxide
[3]Baysilonol ® OL, 10% in ethyl glycol acetate, a product of Bayer AG

What is claimed is:
1. In an alkyd resin-based or oil-free polyester-based lacquer system containing a reactive diluent, the im- provement comprises said reactive diluent being the esterification product of (A) polyols containing on average at least 3 hydroxyl groups per molecule and, per hydroxyl group, an average of 0.5 to 15, but in total no more than an average of 20 ether groups per molecule and (B) 0.05 to 1.0 equivalent, based on hydroxyl groups of A, of aliphatic saturated or unsaturated monocarboxylic acids containing 8 to 24 carbon atoms per molecule, with the proviso that the esterification products of A and B have an acid number of at most 5, a hydroxyl number of from 5 to 800 and, on average, from 0.1 to 5 hydroxyl groups per molecule, and a viscosity of at most 1063 mPa.s at 20° C.

2. The lacquer system claimed in claim 1 wherein the polyols (A) contain an average of 4 to 8 hydroxyl groups per molecule.

3. The lacquer system claimed on claim 1 wherein the polyols (A) contain an average of 1 to 5 ether groups per hydroxyl group.

4. The lacquer system claimed in claim 1 wherein the esterification product is obtained from 0.10 to 0.95 equivalent, based on hydroxyl groups of A), of monocarboxylic acids.

5. The lacquer system claimed in claim 1 wherein the esterification product is obtained from 0.30 to 0.90 equivalent, based on hydroxyl groups of A), of monocarboxylic acids.

6. The lacquer system claimed in claim 1 wherein the esterification product has a hydroxyl number of from 10 to 500.

* * * * *